United States Patent [19]
Byrne et al.

[11] Patent Number: 4,731,395
[45] Date of Patent: Mar. 15, 1988

[54] POLYDICYCLOPENTADIENE HAVING IMPROVED ODOR

[75] Inventors: Brian Byrne, Mahwah; Pierre I. Croquez, Montclair; Barbara C. Gebbia, Totowa, all of N.J.; Paul A. Silver, Wilmington, Del.

[73] Assignee: Hercules Incorporated, Wilmington, Del.

[21] Appl. No.: 863,214

[22] Filed: May 14, 1986

[51] Int. Cl.$^4$ .......................... A61L 9/01; C08F 4/78; C08F 132/08
[52] U.S. Cl. .................................. 523/102; 526/283; 524/856; 512/4
[58] Field of Search .................. 523/102; 526/283; 521/150, 92; 524/856; 252/522 A

[56] References Cited

U.S. PATENT DOCUMENTS

| | | | |
|---|---|---|---|
| 4,400,340 | 8/1983 | Klosiewicz | 526/283 |
| 4,458,037 | 7/1984 | Leach | 526/283 |
| 4,481,344 | 11/1984 | Newburg | 526/283 |
| 4,485,208 | 11/1984 | Klosiewicz | 524/296 |
| 4,496,668 | 1/1985 | Newburg et al. | 521/150 |
| 4,507,453 | 3/1985 | Tom | 526/283 |
| 4,577,006 | 3/1986 | Hollis | 526/283 |
| 4,598,102 | 7/1986 | Leach | 521/150 |
| 4,604,408 | 8/1986 | Newburg | 521/92 |

FOREIGN PATENT DOCUMENTS 0020055  2/1981  Japan .................. 523/102

Primary Examiner—Herbert J. Lilling
Attorney, Agent, or Firm—Ivan G. Szanto

[57] ABSTRACT

Poly(dicyclopentadiene) having improved odor is obtained by incorporating in at least one of the parts of the two part metathesis polymerization catalyst system from about 2 to about 500 ppm (based on the weight of dicyclopentadiene) of liquid deodorant such as cyclacet, cyclaprop, $\beta$-damascenone, $\beta$-damascone, rose oxide, terpene C, citronellyl methyl ether, citronellyl ethyl ether, geranyl methyl ether, geranyl ethyl ether, 2,6-dimethyloctyl methyl ether, 2,6-dimethyloctyl ethyl ether, $\alpha$-terpenyl methyl ether, $\alpha$-terpenyl ethyl ether, methyl salicylate, methyl octin carbonate, and 1,3,5-undecatriene.

20 Claims, No Drawings

POLYDICYCLOPENTADIENE HAVING IMPROVED ODOR

BACKGROUND OF THE INVENTION

1. Field of the Invention

This invention relates to dicyclopentadiene polymers and more specifically it relates to dicyclopentadiene polymers having improved odor containing a deodorant.

2. Description of the Prior Art

U.S. Pat. No. 4,400,340 disclosed the formation of a thermoset polymer of dicyclopentadiene in a reaction injection molding (RIM) process by the use of an olefin metathesis catalyst and the disclosure of this patent is hereby incorporated by reference. Two reactive dicyclopentadiene (DCPD) monomer streams can be combined in a mix head to initiate polymerization, which takes place after injection into a mold. Part one of the two-part metathesis polymerization catalyst system comprises an aluminum alkyl, which can be pre-complexed with a Lewis base, such as an ether or ester, to control the induction time prior to onset of polymerization. Part two is a tungsten compound derived from tungsten hexachloride or tungsten oxytetrachloride.

The poly(dicyclopentadiene) (PDCP) thermoset formed in this way will typically contain levels of unreacted dicyclopentadiene monomer in the range of 0.1-3% by weight. Dicyclopentadiene monomer is characterized by a harsh, pungent, olefinic odor which is detectable at levels as low as 5 parts per billion (ppb) in air. Diffusion of dicyclopentadiene from the molded article imparts a noticeably unpleasant odor. This can be exacerbated when a molded article is trimmed exposing a cut rather than molded surface. Also, when parts are stored in sealed containers, such as shipping cartons, the atmosphere in the container takes on the odor of dicyclopentadiene.

Perfume additives are commercially available for many different plastics to impart a desirable odor to the product. For example, U.S. Pat. No. 3,926,655 disclosed a clear thermoplastic resin consisting essentially of a thermoplastic polyamide resin containing about 1 to 30% perfume oil and jewelry made thereof. The products so obtained give off a fragrant odor.

The perfume additives are generally esters, aldehydes or ketones (or mixtures thereof) having fruity, flowery, woody or other scents. They are used at levels in the parts per hundred range such that the odor of the plastic is masked and replaced with the odor of the perfume. At these levels, however, many perfume additives, especially those containing aldehydes or ketones, are incompatible with the PDCP catalyst system. They interfere with the formation of active catalyst and inhibit the polymerization. For example, at 0.5% fruity vanilla #61604 from S. S. Schoenmann, Inc. polymerization of dicyclopentadiene in test tubes did not occur in 5 minutes compared to 35 seconds for a control with no perfume. At lower levels (parts per million), they are ineffective in masking or neutralizing the odor of dicyclopentadiene. Other additives which are compatible at the high concentration range are ineffective perfumes or odor maskers. For example, limonene, which has a terpenic fragrance, can be added to dicyclopentadiene at a 10% level with no adverse effect on polymerization, but it does not noticeably improve the odor of molded PDCP articles.

SUMMARY OF THE INVENTION

According to the present invention there is provided in a two-part metathesis polymer catalyst system wherein part one comprises a catalyst activator and optionally a rate moderator and part two comprises $WCl_6$ and $WOCl_4$ and optionally a phenolic compound and/or a chelating agent and/or t-butanol, and wherein at least one of said catalyst parts contains dicyclopentadiene monomer, the improvement comprising at least one of said catalyst parts containing from about 2 to about 500 ppm (based on the weight of dicyclopendadiene) of liquid deodorant selected from the group consisting of cyclacet, cyclaprop, β-damascenone, β-damascone, rose oxide, terpene C, citronellyl methyl ether, citronellyl ethyl ether, geranyl methyl ether, geranyl ethyl ether, 2,6-dimethyloctyl methyl ether, 2,6-dimethyloctyl ethyl ether, α-terpenyl methyl ether, α-terpenyl ethyl ether, methyl salicylate, methyl octin carbonate, and 1,3,5-undecatriene.

Further provided according to the present invention is a thermoset dicyclopentadiene polymer having improved odor containing from about 2 to about 500 parts per million (based on the weight of dicyclopentadiene) of the above liquid deodorant.

Still further provided according to the present invention are thermoset dicyclopentadiene polymers in the form of molded articles.

DETAILED DESCRIPTION OF THE INVENTION

Surprisingly, it has been found that the incorporation of small amounts of certain deodorant additives in the precursor of thermoset dicyclopentadiene polymers will not interfere with the polymerization reaction and will significantly improve the odor of the resulting polymer. In order to reduce the apparent odor of PDCP molded articles, a liquid deodorant additive can be incorporated into one or both reactive monomer streams employed in the process of preparing the thermoset polymer of dicyclopentadiene in a RIM process using olefin metathesis catalysts.

The deodorant additives act to neutralize the odor of unreacted dicyclopentadiene monomer (typically present in the range of about 0.1-3% by weight) by altering the perceived odor to a different and more acceptable one. To be useful, the deodorant additives must be chemically compatible with the metathesis catalyst when incorporated into the monomer stream at an effective concentration such that they do not impede or prevent the polymerization of dicyclopentadiene.

Suitable deodorant additives and their effective use levels are not predictable from their intrinsic odors or chemical structures. Several of the deodorants have nondescript or unpleasant odors of their own and there are several different structures represented by the additives found suitable. The deodorants found to be useful exhibit different odors and contain several different organic structures. They are: cyclacet [hexahydro-4,7-methanoindene-5(or 6)-yl acetate], cyclaprop [hexahydro-4,7-methanoindene -5(or 6)-yl propionate], β-damascenone [2-buten-1-one, 1-(2,6,6-trimethyl-1,3-cyclohexadiene-1-yl)], β-damascone (2,6,6-trimethyl-1-crotonyl cyclohexene-1), rose oxide [cis-2-(2-methyl-1-propenyl)-4-methyltetrahydropyran] and terpene C (1.4-cineol or 1.8 cineol or mixtures thereof), citronellyl methyl ether, citronellyl ethyl ether, geranyl methyl ether, geranyl ethyl ether, 2,6-dimethyloctyl methyl ether, 2,6-dimethyloctyl ethyl ether, α-terpenyl methyl ether, α-terpenyl ethyl ether, methyl salicylate, methyl octin carbonate, and 1,3,5-undecatriene. Preferred deodorants are selected from the group consisting of cyclacet, cyclaprop, β-damascenone, β-damascone, rose oxide and terpene C. The most preferred deodorant is rose oxide. The deodorant additives are useful in a concentration range of from about 2 to about 500 parts per million (ppm) based on the weight of dicyclopentadiene monomer charged. Preferably the deodorant is present in an amount of from about 2 to about 100 ppm, and most preferably the deodorant is present in an amount of from about 20 to about 30 ppm.

The deodorant additive can be added to either catalyst stream or to both of the catalyst streams; however, preferably the deodorant is added only to the catalyst stream containing the tungsten catalyst.

Table 1 illustrates the chemical compatibility of the deodorant additives wherein there is shown the results of laboratory polymerizations of dicyclopentadiene in test tubes containing high levels of the additives compared to controls with no additive. The catalyst system for these examples was based on $WCl_6$/tri-n-octylaluminum (TNOA)/diglyme (diethylene glycol dimethyl ether). The polymerization was conducted at monomer/W/Al/diglyme mole ratio of 1000/1/3/3. Longer term compatibility is illust-rated by storing the additive in contact with the W-catalyst for 24 hours prior to polymerization (-X samples in Table 1).

When the additives are used in the range of about 2-500 ppm dicyclopentadiene the monomer/W mole ratio may be adjusted to a range of about 500/1 to 2000/1 and the W/Al mole ratio may be adjusted to a range of about 1/2 to 1/6. The Lewis base used to control polymerization induction time (e.g., diglyme) is adjusted so that the Al/Lewis base mole ratio is preferably maintained at about 1/1. This will provide a cycle time (mix, inject, cure and demold) suitable for RIM processing. In a most preferred embodiment, the deodorant additive is rose oxide at 24 ppm based on dicyclopentadiene and the monomer/W/Al/diglyme mole ratio is 1000/1/3/3.

The following examples are given for the purpose of illustrating the present invention. All parts and percentages are by weight unless otherwise indicated.

TABLE 1

COMPATIBILITY OF DEODORANT ADDITIVES
WITH METATHESIS CATALYST

| Additive | Concentration (%) | Induction Time (sec.) | Exotherm (°C.) |
|---|---|---|---|
| Control | — | 23 | 160 |
| Control-X | — | 30 | 159 |
| Rose Oxide | 1.2 | 27 | 166 |
| Rose Oxide-X | 1.2 | 40 | 170 |
| Cyclacet | 3.0 | 20 | 164 |
| Cyclacet-X | 3.0 | 50 | 167 |
| Cyclaprop | 3.0 | 23 | 162 |
| Cyclaprop-X | 3.0 | 37 | 162 |
| Terpene C | 5.1 | 34 | 166 |
| Terpene C-X | 5.1 | 30 | 167 |

X = Sample stored 24 hours with W-catalyst.

PROCEDURE FOR ODOR EVALUATION

Sensory evaluation of molded plaques was conducted by sealing a 1"×1"×⅛" sample cut from a 10"×10"×⅛" molded plaque containing deodorant in a 1-gallon glass jar. After equilibration for 24 hours, three panelists sampled the head space of the jar and compared it to a control, a sample with no deodorant. Evaluations were repeated daily over a period of five days. Classifications were: "worse", "no improvement", "slight improvement", or "improvement" as compared to the control.

EXAMPLE 1

Rose Oxide

The monomer stream containing part one of the catalyst system consisted of 12.5 lbs. of a dicyclopentadiene solution made of 94% of dicyclopentadiene and 6% of dissolved styrene/butadiene rubber (SBR) and a dicyclopentadiene solution, 1 molar in aluminum alkyl, containing tri-n-octyl aluminum/di-n-octyl aluminum iodide/diglyme in a mole ratio of 0.85/0.15/3.

The monomer stream containing part two of the catalyst system consisted of 12.5 lbs. of dicyclopentadiene solution made of 94% of dicyclopentadiene and 6% of dissolved SBR, 115 g. of Irganox 1076 [octadecyl 3-(3′, 5′-di-t-butyl-4′-hydroxyphenyl) propionate anti-oxidant supplied by Ciba Geigy], 161 ml. of 0.5 molar W-catalyst solution in toluene (taken from 2 liter solution of 1 mole of $WCl_6$, 0.25 mole of t-butanol, 1.2 moles of nonylphenol, and 2 moles of acetyl acetone in toluene) and 25 ml. of a 1% rose oxide solution in dicyclopentadiene.

Reaction injection molding of the two monomer streams in equal volumes into a 10"×10"×⅛" mold produced PDCP plaques which were relatively odor free as judged by a sensory panel (see Table 2). Molding was carried out in an Accuratio RIM II equipment at the following conditions: mold temperature 70° C., circulation and injection pressure 1000 psi, day tanks temperature 40° C., and demold time 30 seconds.

EXAMPLE 2

β-Damascone

Example 2 was carried out in the same manner as Example 1 except that 25 ml. of a 0.16% solution of β-damascone in dicyclopentadiene was used in place of rose oxide.

EXAMPLE 3

β-Damascenone

Example 3 was carried out in the same manner as Example 1 except that 25 ml. of a 0.1% solution of β-damascenone in dicyclopentadiene was used in place of rose oxide.

EXAMPLE 4

Cycloaprop

Example 4 was carried out in the same manner as Example 1 except that 25 ml. of a 13.7% solution of cyclaprop in dicyclopentadiene was used in place of rose oxide.

EXAMPLE 5

Cycloacet

Example 5 was carried out in the same manner as Example 1 except that 25 ml. of a 13.7% solution of cyclacet in dicyclopentadiene was used in place of rose oxide.

EXAMPLE 6

Terpene C

Example 6 was carried out in the same manner as Example 1 except that 25 ml. of 22.8% solution of terpene C in dicyclopentadiene was used in place of rose oxide.

TABLE 2
SENSORY PANEL EVALUATION OF PDCP CONTAINING DEODORANTS

| Deodorant | Concentration (PPM DCPD) | Evaluation (Compared to Control) |
| --- | --- | --- |
| Rose Oxide | 24 | Improvement |
| β-Damascone | 3.4 | Improvement |
| β-Damascenone | 2.0 | Improvement |
| Cyclaprop | 300 | Improvement |
| Cyclacet | 300 | Improvement |
| Terpene C | 500 | Improvement, slightly citrus, fresher |

We claim:

1. In a two-part metathesis polymer catalyst system wherein part one comprises a catalyst activator and optionally a rate moderator, and part two comprises $WCl_6$ and $WOCl_4$ and optionally a phenolic compound and/or a chelating agent and/or t-butanol, and wherein at least one of said catalyst parts contains dicyclopentadiene monomer, the improvement comprising at least one of said catalyst parts containing from about 2 to about 500 ppm (based on the weight of dicyclopendadiene) of liquid deodorant selected from the group consisting of cyclacet, cyclaprop, β-damascenone, β-damascone, rose oxide, terpene C, citronellyl methyl ether, citronellyl ethyl ether, geranyl methyl ether, geranyl ethyl ether, 2,6-dimethyloctyl methyl ether, 2,6-dimethyloctyl ethyl ether, α-terpenyl methyl ether, α-terpenyl ethyl ether, methyl salicylate, methyl octin carbonate, and 1,3,5-undecatriene.

2. The improved catalyst system of claim 1 wherein said liquid deodorant is selected from the group consisting of cyclacet, cyclaprop, β-damascenone, β-damascone, rose oxide and terpene C.

3. The improved catalyst system of claim 2 wherein said liquid deodorant is selected from the group consisting of cyclacet, cyclaprop, β-damascenone, and β-damascone.

4. The improved catalyst system of claim 1 wherein said liquid deodorant is present in an amount of from about 2 to about 100 ppm.

5. The improved catalyst system of claim 1 wherein the liquid deodorant is present only in part two.

6. The improved catalyst system of claim 2 wherein said liquid deodorant is present in an amount of from about 2 to about 100 ppm and wherein the liquid deodorant is present only in part two.

7. The improved catalyst system of claim 6 wherein said liquid deodorant is rose oxide.

8. The improved catalyst system of claim 6 wherein said liquid deodorant is present in an amount of from about 20 to about 30 ppm.

9. The improved catalyst system of claim 6 wherein said liquid deodorant is rose oxide present in an amount of from about 20 to about 30 ppm.

10. The improved catalyst system of claim 9 wherein the rose oxide is present in an amount of about 24 ppm.

11. A thermoset dicyclopentadiene polymer having improved odor containing from about 2 to about 500 ppm (based on the weight of dicyclopentadiene) of the liquid deodorant of claim 1.

12. A thermoset dicyclopentadiene polymer having improved odor containing from about 2 to about 500 ppm of the liquid deodorant of claim 3.

13. A thermoset dicyclopentadiene polymer having improved odor containing from about 2 to about 100 ppm of the liquid deodorant of claim 2.

14. The thermoset dicyclopentadiene polymer of claim 13 wherein said liquid deodorant is rose oxide present in an amount of from about 20 to about 30 ppm.

15. The thermoset dicyclopentadiene polymer of claim 14 wherein the rose oxide is present in an amount of about 24 ppm.

16. The thermoset dicyclopentadiene polymer of claim 11 in the form of a molded article.

17. The thermoset dicyclopentadiene polymer of claim 12 in the form of a molded article.

18. The thermoset dicyclopentadiene polymer of claim 13 in the form of a molded article.

19. The thermoset dicyclopentadiene polymer of claim 14 in the form of a molded article.

20. The thermoset dicyclopentadiene polymer of claim 15 in the form of a molded article.

* * * * *

UNITED STATES PATENT AND TRADEMARK OFFICE
CERTIFICATE OF CORRECTION

PATENT NO. : 4,731,395

DATED : March 15, 1988

Page 1 of 2

INVENTOR(S) : BYRNE, CROQUEZ, GEBBIA & SILVER CASE 1

It is certified that error appears in the above-identified patent and that said Letters Patent are hereby corrected as shown below:

Column 3, Line 27

"illust- rated"   should be   --illustrated--

Column 5, Line 33

"dicyclopendadiene"   should be --dicyclopentadiene--.

UNITED STATES PATENT AND TRADEMARK OFFICE
CERTIFICATE OF CORRECTION

PATENT NO. : 4,731,395
DATED : March 15, 1988
INVENTOR(S) : BYRNE, CROQUEZ, GEBBIA & SILVER CASE 1

It is certified that error appears in the above-identified patent and that said Letters Patent are hereby corrected as shown below:

Column 4, Line 55

"Cycloaprop" should be --Cyclaprop--

Column 4, Line 63

"Cycloacet" should be --Cyclacet--.

Signed and Sealed this

Second Day of August, 1988

Attest:

DONALD J. QUIGG

*Attesting Officer*    *Commissioner of Patents and Trademarks*